United States Patent [19]

Engle

[11] Patent Number: 4,653,812

[45] Date of Patent: Mar. 31, 1987

[54] TRUCK MOUNTED PNEUMATIC BRAKE CONTROL SYSTEM

[75] Inventor: Thomas H. Engle, Cape Vincent, N.Y.

[73] Assignee: General Signal Corporation, Stamford, Conn.

[21] Appl. No.: 776,763

[22] Filed: Sep. 16, 1985

[51] Int. Cl.$^4$ .............................................. B60T 11/34
[52] U.S. Cl. ......................................... 303/33; 303/8; 303/22 R; 303/23 R; 303/38; 303/81
[58] Field of Search ........................ 303/33, 35, 36–47, 303/34, 28–32, 57, 64, 66, 68–70, 78, 81, 86, 22 A, 22 R, 23 R, 23 A, 6 C, 7, 8, 13, 82; 188/195, 349; 137/494

[56] References Cited

U.S. PATENT DOCUMENTS

| | | | |
|---|---|---|---|
| 2,734,783 | 2/1956 | Safford | 303/22 R |
| 3,175,871 | 3/1965 | Wilson | 303/82 |
| 3,570,529 | 3/1971 | Pickert | 137/494 |
| 3,671,086 | 6/1972 | Scott | 303/23 R |
| 3,716,276 | 2/1973 | Wilson et al. | 303/36 X |
| 4,080,005 | 3/1978 | Engle | 303/23 R X |
| 4,127,308 | 11/1978 | McEathron | 303/35 |
| 4,188,071 | 2/1980 | Hart | 303/33 |
| 4,441,764 | 4/1984 | Newton | 303/33 X |
| 4,509,801 | 4/1985 | Newton et al. | 303/8 |

Primary Examiner—Douglas C. Butler
Attorney, Agent, or Firm—Barnes & Thornburg

[57] ABSTRACT

A railway car has a brake control equipment group on each truck for governing the brakes thereof including simplified light weight triple valve and reservoir equipment and a modulation equipment group is disposed between trucks of the car providing normal per car requirements for modulating pressure in the brake pipe that would normally be provided by a conventional ABD valve required for each truck equipment group.

36 Claims, 6 Drawing Figures

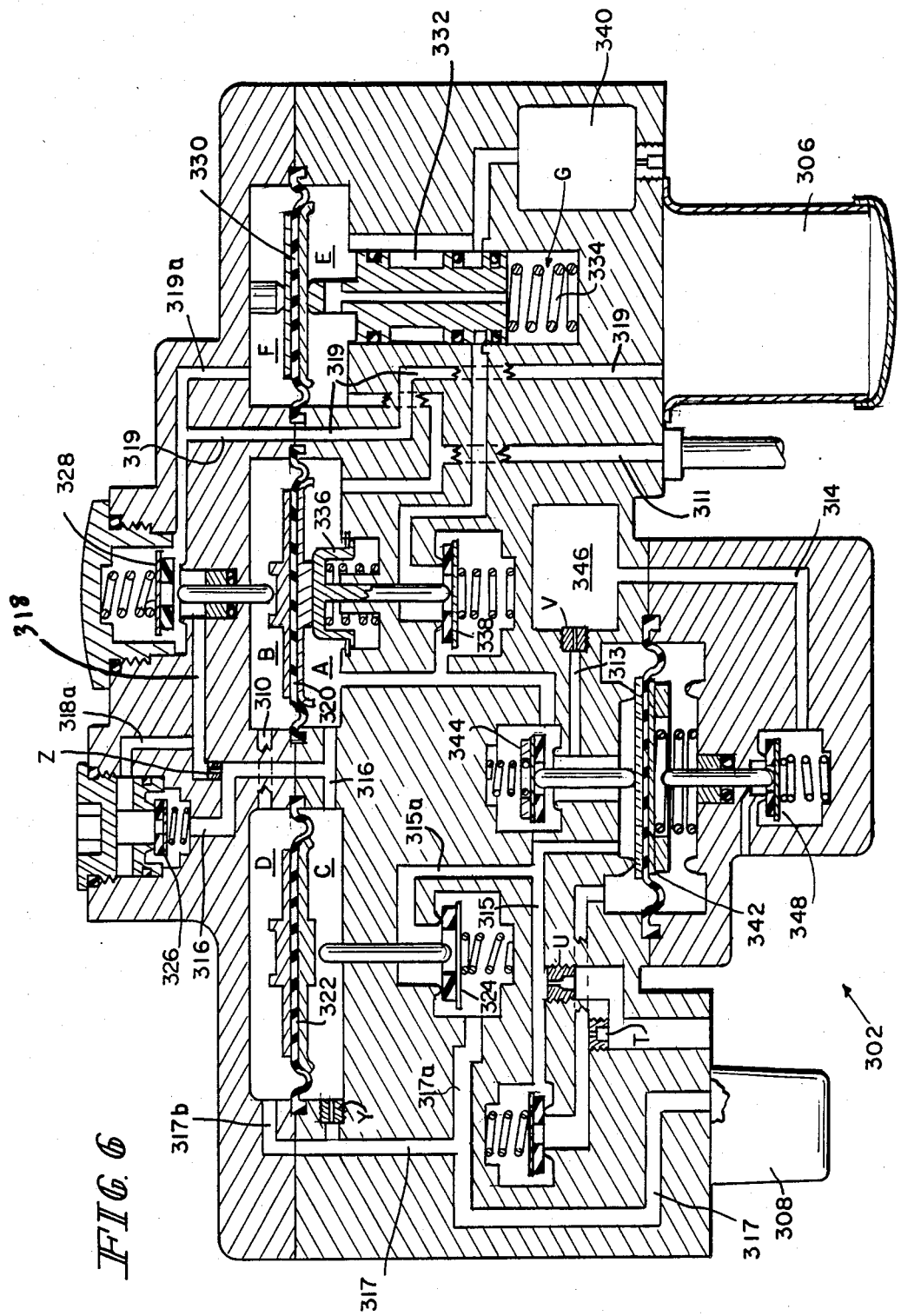

4,653,812

TRUCK MOUNTED PNEUMATIC BRAKE CONTROL SYSTEM

BACKGROUND AND SUMMARY OF THE INVENTION

The present invention relates generally to pneumatic rail brake systems and more specifically to improved components for the system.

The prior art brake systems were generally standardized to include an ABD or equivalent braking valve connected by conduits to the brake pipe, auxiliary and emergency reservoirs and brake cylinders. These brake valves would control all the brakes on the trucks of a single car. If more than two trucks were to be controlled by the brake valve, relay valves were included. These systems include a substantial amount of conduits connecting the elements of the brake system on each of the cars. The ABD and equivalant brake valves include the service application, emergency application, release and accelerated release function. With the development of non-conventional car designs, brake systems which are adapations of the preexisting brake systems were developed. These and the conventional brake systems include an unnecessary amount of conduits per car and unnecessarily large reservoirs.

Thus, it is an object of the present invention to provide a simplified fluid brake system for rail vehicles.

Another object of the present invention is to provide a braking system which reduces the size of the auxiliary and emergency reservoirs.

A further object of the present invention is to eliminate unnecessary piping and reduce the number of sources of fluid leakage.

Another object of the present invention is to provide a group of standard parts or modules which can be economically applied to any type of freight car without special engineering, including articulated cars having any number of trucks between couplers.

These and other objects of the invention are attained by providing a triple valve assembly having reduced auxiliary and emergency reservoirs mounted directly thereon. The assembly is connected only to the brake pipe and to the brake cylinder of one truck and controls the interconnection between the brake pipe, brake cylinder, auxiliary reservoir and emergency reservoir to produce charging of the reservoirs, service application and emergency application of the brakes and release of air to the brake cylinder. The unique triple valve, in response to the venting of brake pipe which characterizes an emergency brake application, provides a sequential application of pressure to the brake cylinder: First the auxiliary reservoir pressure is equalized with that of the brake cylinder, followed by disconnection of the auxiliary reservoir from an application of the emergency reservoir to the brake cylinder. This sequential operation allows increased brake cylinder pressure while allowing reduction in the volume of the emergency reservoir used to accomplish this pressure.

In both service and emergency applications, a variable flow rate valve is connected between the supply portion of the triple valve and the brake cylinder to allow a high flow during the initial application of the air to the brake cylinder with a decreased flow rate during the second stage.

The triple valve assembly is easily adaptable for receiving a load responsive fixture. This fixture includes a first path for connecting the supply to the brake cylinder and to a volume reservoir and providing a predetermined portion of supply pressure to the brake cylinder. A second path controlled by the load is connected in parallel with the first path, and bypasses the proportioning path and cuts off the volume reservoir for a loaded sensed condition. A double acting piston is provided to simultaneously open the bypass and close the dummy reservoir or connect the dummy reservoir and close the bypass. The bypass is also responsive to a brake released signal to bypass the proportioning device during a brake release sequence.

A modulating valve is also provided independent of the triple valve assemblies, which enhances brake pipe pressure reduction by filling a quick service volume with fluid from the brake pipe for a service signal, and sequentially venting a bulb volume to the atmosphere and refills the bulb volume from the brake pipe as a function of the magnitude of the service signal. The modulating valve also charges the brake pipe with previously stored fluid so as to enhance the rise of brake pipe pressure, hence release of the brakes from a release reservoir in response to a release signal. The filling of the quick service volume occurs at a rate controlled as a function of the differential pressure between the release reservoir and the brake pipe. A quick action chamber is included for providing accelerated response for filling the quick service volume and venting the bulb volume. The quick action chamber is vented after the accelerated initiation and has no effect during further brake pipe pressure reduction activity.

Other objects, advantages and novel features of the present invention will become apparent from the following detailed description of the invention when considered in conjunction with the accompanying drawings.

BRIEF DESCRIPTION OF THE DRAWINGS

FIG. 5 is a cross-sectional view of the load fixture incorporating the principles of the present invention.

FIG. 6 is a cross-sectional view of the modulation valve incorporating the principles of the present invention.

DETAILED DESCRIPTION OF THE DRAWINGS

Figure 1:
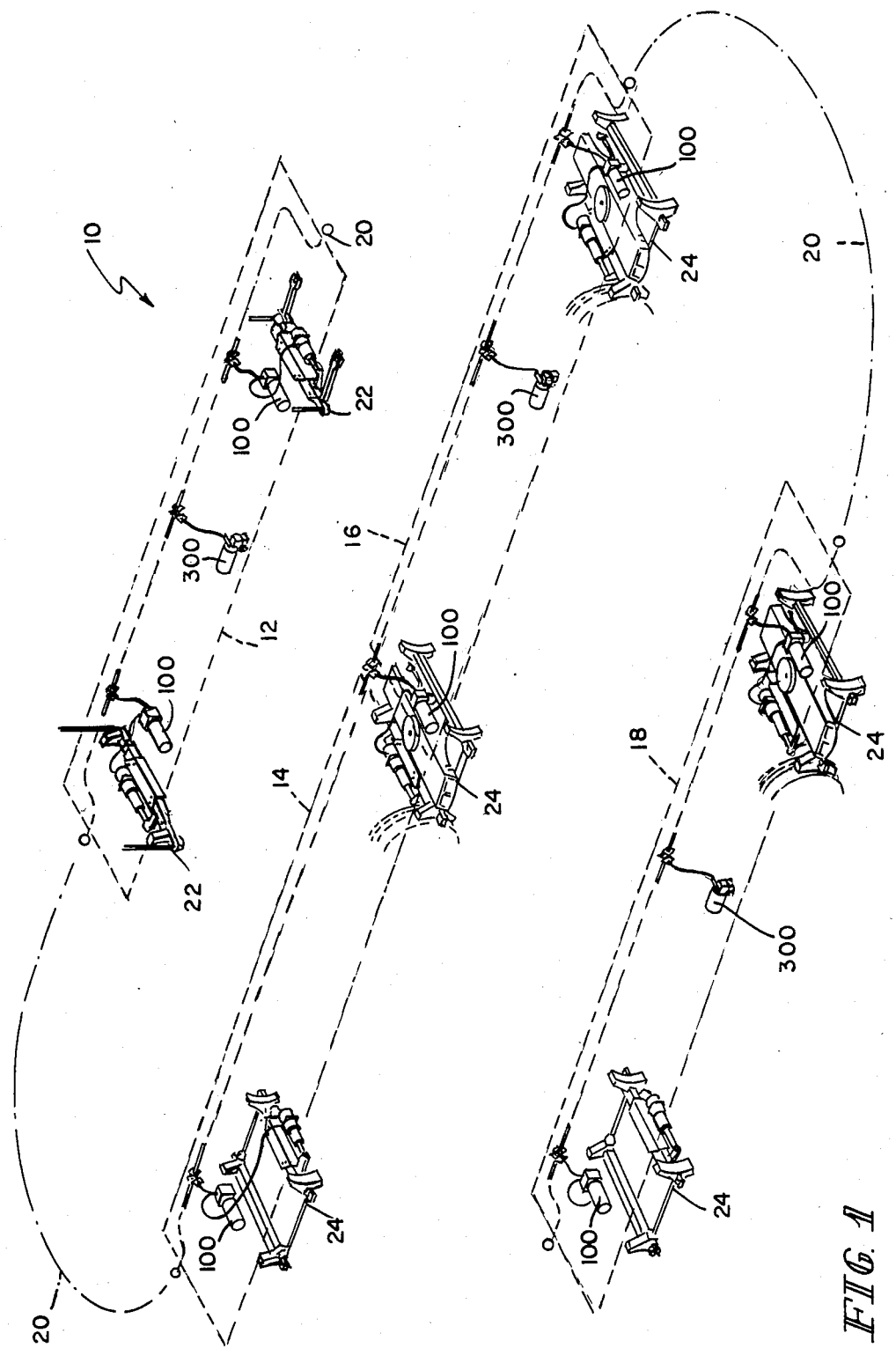
FIG. 1 is a schematic perspective of a train brake system made up of different types of cars.

A train 10 is illustrated in FIG. 1 includes a plurality of cars 12, 14, 16 and 18 of different styles for purpose of illustration. Car 12 is a two-axle car, cars 14 and 16 are articulated cars sharing a common axle and car 18 is a conventional car having two axles per truck. A brake pipe 20 extends throughout the train 10. Each of the cars include a brake system which for car 12 is a single axle brake 22 and for cars 14, 16 and 18 are double axle brake systems 24. Included at each brake system are a truck 22 and 24 is a triple valve 100 incorporating the principles of the invention. Also spread throughout the train at approximately 75 foot intervals are modulation valve systems 300. Thus, it can be seen that a braking valve is included at each truck irrespective of the truck and car design.

Figure 2:
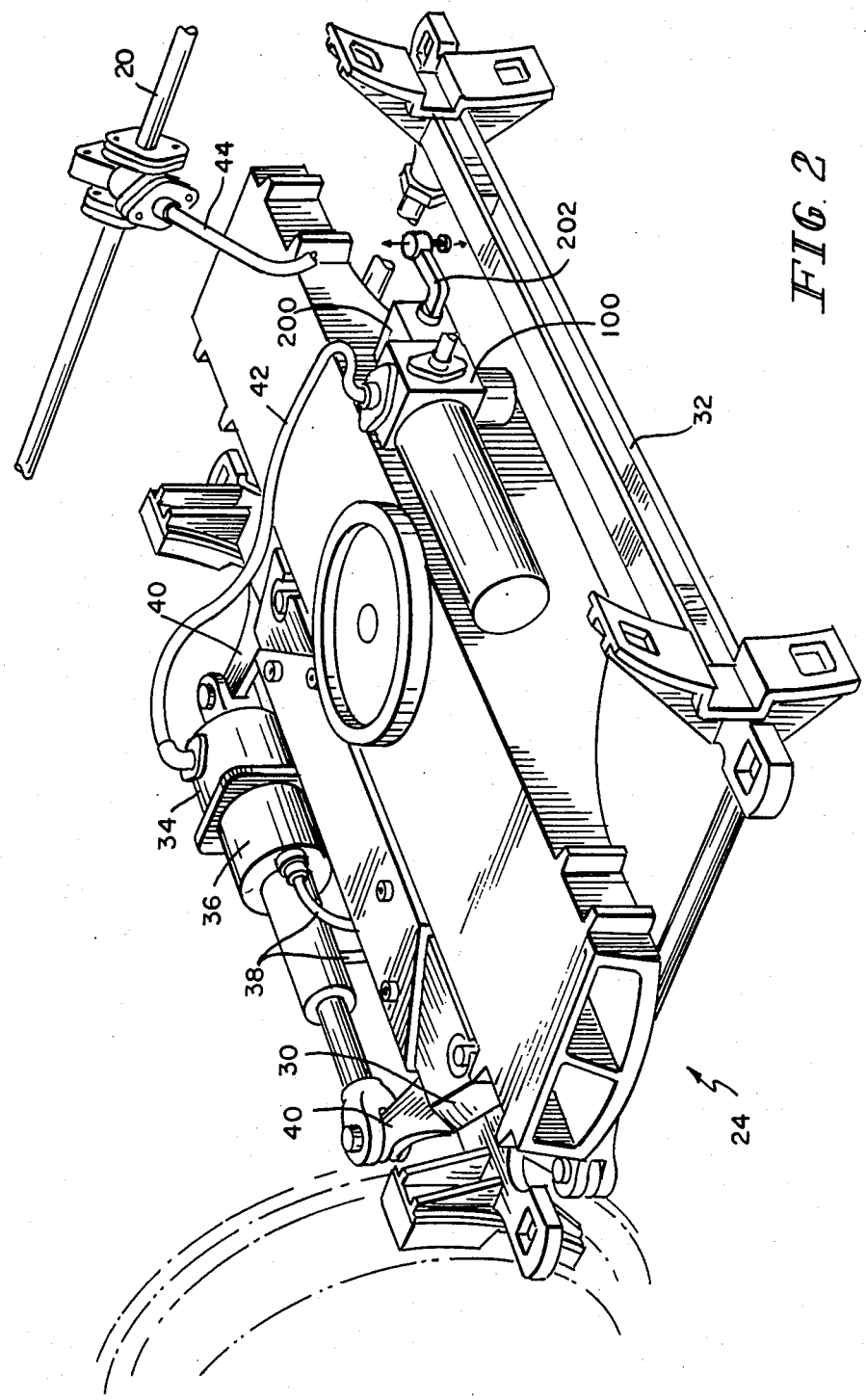
FIG. 2 is a perspective view of a truck mounted brake incorporating the valve and reservoir of the present invention.

The twin axle brake 24, as shown in FIG. 2, consists of a pair of brake beams 30, 32 and a single actuator 34 equipped with double-acting slack adjuster 36 and cable 38 operated parking brake. The actuator 34 is supported by, and lies along side, beam 30 and operates to spread a pair of bell cranks 40, whose ends are attached so as to drive the opposite brake beam 32 against its wheels. The pivot points of the bell cranks 40 in the master beam 30 react to the equal and opposite force generated by this action which pushes the master beam up against its wheels.

The 17" total available stroke of the actuator is sufficient to permit the beams to mount 2⅜" brake shoes and to operate without adjustment through the life of these shoes and through a full cycle of wheel wear.

The combined reservoir and triple valve 100, as shown in FIG. 2, is designed to be mounted to the truck bolster and connected with armored hoses 42 and 44 to both the brake actuator and the brake pipe respectively. The triple valve is comprised of three die castings and includes: a simple triple valve to produce service brake cylinder pressure, an emergency equalizing valve to provide high brake cylinder pressure in emergency, and an inshot valve to produce rapid filling of the actuator followed by a controlled brake cylinder pressure rise, which should be particularly important in an emergency brake application.

In connection with the triple valve portion, it should be noted that no release insuring quick service or emergency brake pipe related functions are included. When brake pipe pressure reduces to zero, the triple valve reacts by raising the brake cylinder pressure approximately 15% higher than the value attained at full service equalization. This will be described in detail below with respect to FIG. 4.

To provide cars having high gross-to-tare weight ratios with a more even braking ratio over the entire load range, the triple valve 100 brake equipment includes an optional empty load fixture 200, as shown in FIG. 2. Because of the location of the basic triple valve portion of the truck bolster, the empty load fixture can be added by simply replacing a blanking plate with the additional portion as shown in the figure. The empty load portion has a load arm 202, which can be connected to, or rest upon, the truck frame spring basket so as to detect empty or loaded condition by the height of the bolster relative to this basket. Since this dimension is unaffected by centerplate or side bearing wear or truck swiveling, it provides a reliable, repeatable measure of spring deflection and, therefore, car load.

In operation, the empty load fixtures operate on the proportioning principle, except that the dummy reservoir is on the high pressure rather than the low pressure side of the proportioning valve, resulting in its volume having to be only 69 cu. in., which volume is easily enclosed in the empty load portion itself.

Figure 3:
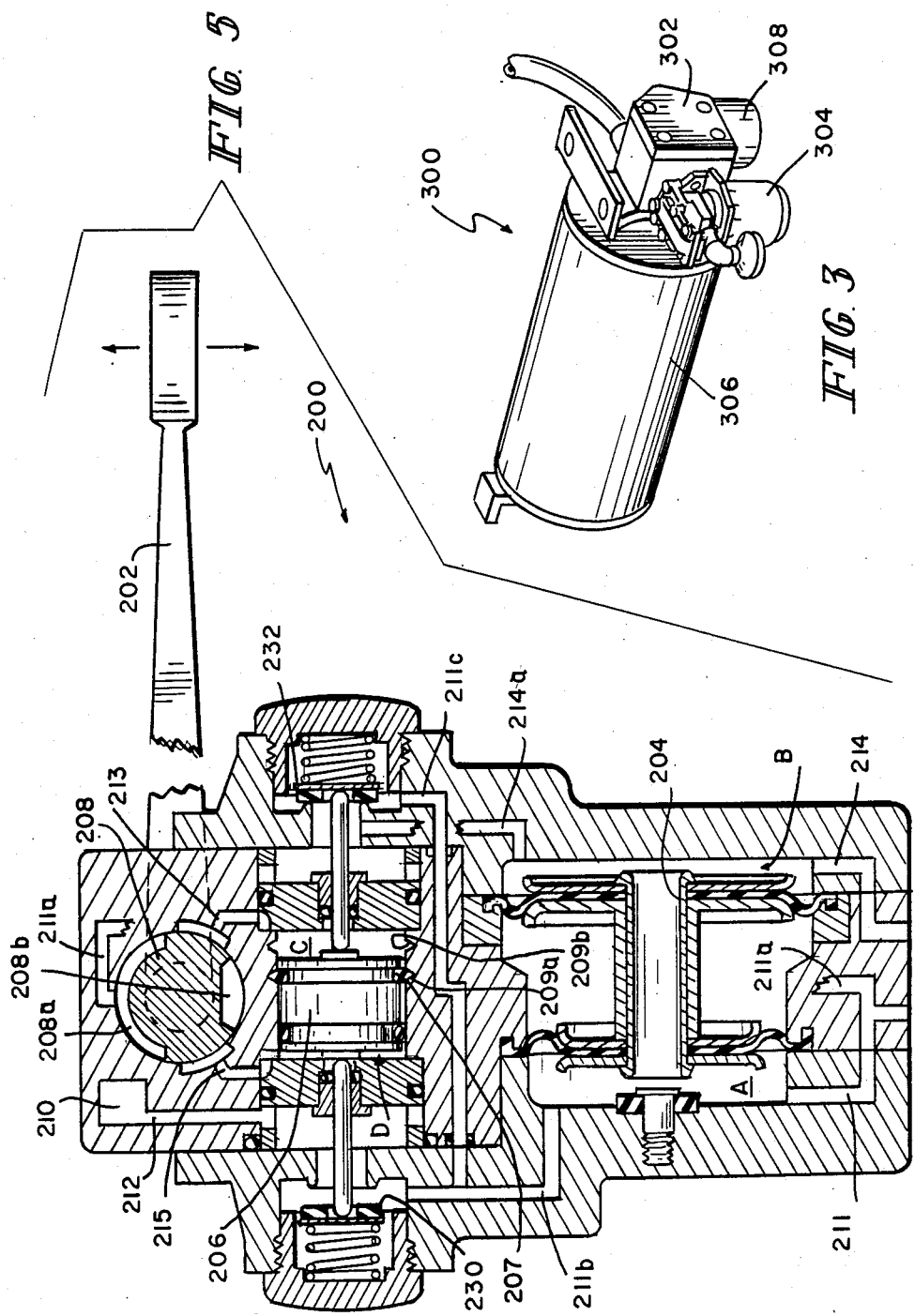
FIG. 3 is a perspective view of the modulation valve of the present invention.

The brake pipe modulation group 300, in FIG. 3, consists of an E-1 modulation valve 302 and KM-2 vent valve 304 mounted to the ends of a 10×20 release reservoir 306. The functions of this valve are to provide all of the brake pipe stabilizing and accelerating features of both the service and emergency portions of the present ABDW control valve. In particular, the following are carried out:

(a) The quick service function detects brake pipe pressure reductions beyond a fixed amount and opens brake pipe to a quick service volume so as to produce rapid serial transmission of service application and assure a minimum brake pipe reduction.

(b) An accelerated application valve provides continuous quick service activity for brake pipe reduction at a service rate beyond quick service.

(c) An accelerated release valve provides a dumpback to brake pipe of the 1600 cu. in. release volume, any time brake pipe pressure rises more than a fixed amount, whether as a result of service or emergency release. There is no accelerated release after emergency because the 318 cu. in. of air stored in the two actuators on a typical car would provide a negligible improvement in brake pipe release when compared with the 1256 cu. in. available on a 10×12 cylinder at 8" piston travel.

(d) Rapid transmission of emergency brake application from any cause is propagated solely by the KM-2 vent valve portion.

Triple Valve 100

Figure 4:
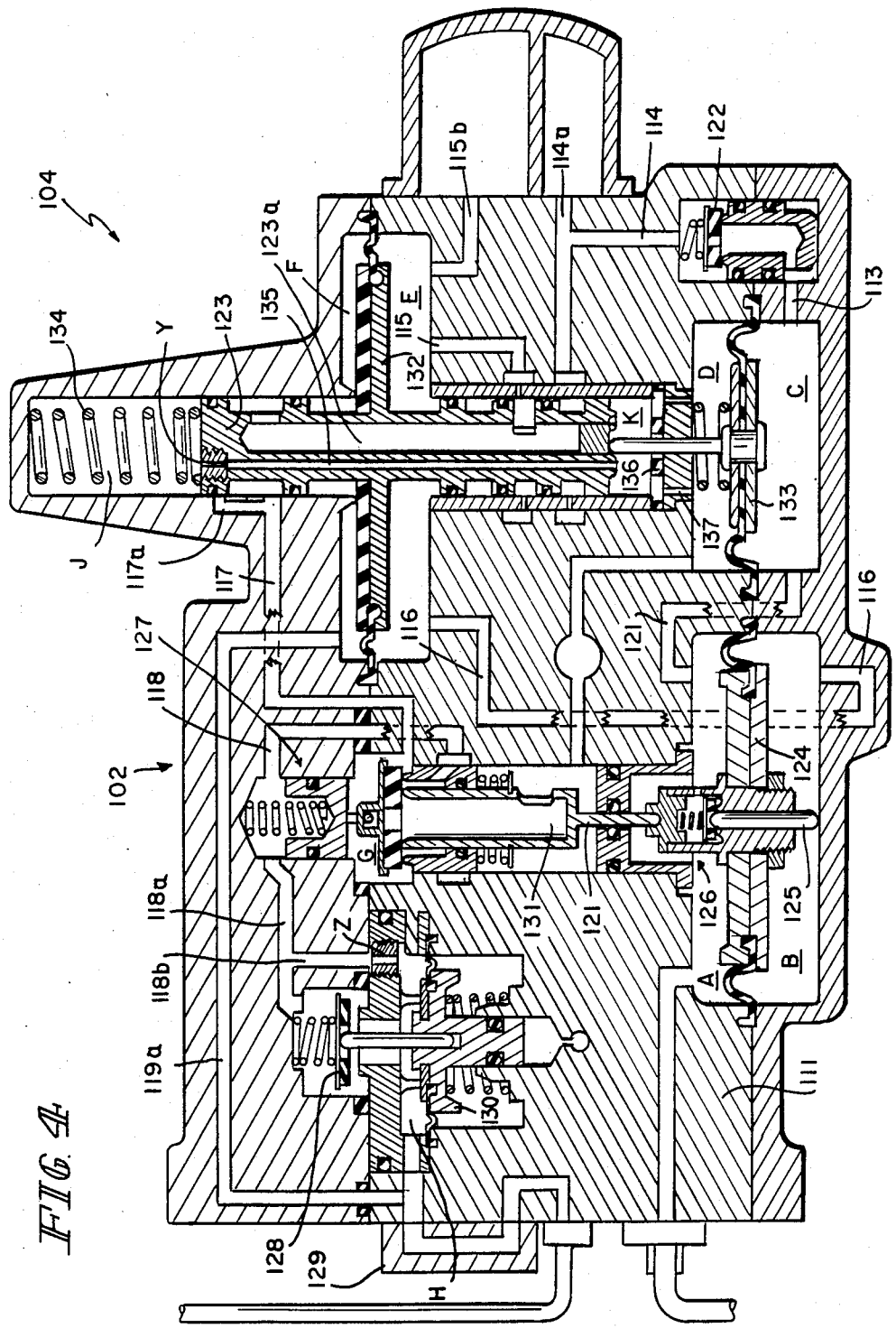
FIG. 4 is a cross-section of the supply valve of the present invention.

The triple valve 100 as illustrated in FIG. 4 includes three devices: the "A" triple valve 102, the "B" emergency equalizing valve 104 and a brake cylinder inshot valve 106.

Positions of the triple valve are release and charging, service, service lap and emergency. During both service and emergency brake application, there is both a first and second stage of brake cylinder pressure development controlled by the inshot valve 106. In emergency, a third stage of development increased brake cylinder pressure by approximately 15% above full service.

Operation of the equipment for each of the above positions is as detailed below.

OPERATION

Charging

In the release and charging position, brake pipe air from the brake pipe enters triple valve 102, through passage 14 to Chamber A, moving the valve stem 121 downward and flows through Passage 112 to equalizing reset piston, Chamber C, and through Passage 113 to the underside of the emergency reservoir charging check 122. Air flowing through this check 122 and Passage 114 charges the 150 cu. in. emergency reservoir and flows by Passage 114a to the emergency equalizing valve spool 123 where it is blocked. Note that when the triple valve piston 124 moves downward, Pilot Pin 125 raises the auxiliary reservoir charging check 126 from its seat, permitting brake pipe air to flow from Chamber A through the open charging check 126 and the hollow stem of the triple valve piston 124 into Chamber B, below the triple piston 124, from whence it flows through Passage 116 into Chamber E to the lower face of the emergency equalizing valve piston 132 holding this valve in its upper position. From Chamber E, air flows through Passage 115 to the emergency equalizing valve spool 123 and simultaneously through Passage 115b to the 650 cu. in. auxiliary reservoir.

With both reservoirs charged, pressure across the triple valve piston 124 will equalize; and it will move upward allowing the charging check 126 to close cutting off communication between the brake pipe and auxiliary reservoir. This is the release lap position of the triple valve 102.

Note that with the emergency equalizing valve 104 in its upper position, air from Passage 115 passes upward through the hollow 123a of stem 123 of this valve through Passage 117 to Chamber G of the closed brake cylinder supply valve of the triple valve 102.

Service Application

During a service application of brakes, brake pipe pressure reduction in Chamber A will cause the triple valve stem 121 to move upward, unseating the supply valve 127 from its outer seat and connecting auxiliary reservoir pressure from Chamber G past the supply valve seat to Passage 118, through which it flows to the top of the open inshot valve check 128, through this valve to Chamber H, thence, through Passage 119 and the empty load blanking plate 129 to brake cylinder.

Brake cylinder air is also fed back through Passage 119a to Chamber F above the emergency equalizing valve 104.

As brake cylinder pressure continues to build up during a second stage of a service or emergency application, it passes through Chamber H of the open inshot valve check 128. When sufficient air has flowed into the brake cylinder to raise its pressure to approximately 15 psi, the diaphragm piston 130 of Chamber H moves down allowing the inshot valve check 128 to close. Further build up of brake cylinder pressure is under the control of Choke Z. Thus, inshot valve 106 is a variable flow rate valve allowing high flow during the initial stage of brake pressure build-up and a low flow rate in the latter stages.

As air flows from the auxiliary reservoir to the brake cylinder, the pressure in Chamber B, beneath the triple valve, piston 124 falls until it nearly equals that of Brake Pipe in Chamber A, at which point the valve stem 121 will move downward and allow the supply valve 127 to close on its outer seat. This will prevent the supply of further auxiliary reservoir air to brake cylinder and, hence, terminate the reduction of pressure in the auxiliary reservoir and Chamber B, placing the valve 127 in service lap position.

Release after Service

With the supply valve 127 initially in the service lap position, any increase in brake pipe pressure will cause the pressure in Chamber A to rise above Chamber B, which will pull the triple valve stem 121 down away from the supply valve 127, opening the inner seat and permitting brake cylinder air to flow back through the inshot check valve 128, opening it, hence, through Passage 118a and 118 past the open supply valve inner seat, thence, through the hollow 131 of stem 121 of the triple valve 102 to atmosphere. Simultaneously with the above, brake cylinder feedback pressure in Chamber F will reduce through Passage 119a along with brake cylinder.

Note that reduction of brake cylinder pressure in this manner does not upset the balance of brake pipe pressure over auxiliary reservoir, and the triple valve 102 remains in its release position until brake cylinder pressure reduces to zero.

Note also that if the brake pipe pressure is only slightly higher than auxiliary reservoir, the supply valve 127 inner seat will be open; but because of the length of the auxiliary reservoir charging check valve pilot pin 125, the charging check 126 will remain on its seat preventing premature charging of the auxiliary reservoir and, thus, assuring that no air will be trapped in the brake cylinder. Only when a slightly greater pressure exists in the brake pipe than in auxiliary reservoir will the triple valve stem 121 be forced downward sufficiently to open the charging valve 126.

A modification to the triple valve could be made in which further travel of the triple valve downward would lead to a retarded recharge position on cars near the head of the train. However, the 650 cu. in. auxiliary reservoir takes so little charging air that this may not be necessary.

Emergency Application

In an emergency brake application, brake pipe pressure is suddenly reduced to zero. Triple valve 102 action is identical with that described above under service brake application, and a 15 lb. inshot of air to the brake cylinder will be made prior to closing of the inshot valve check 128, as in service. From the point of closing of the inshot valve check 128 until brake cylinder pressure rises to within 2 psi of auxiliary reservoir pressure, brake cylinder pressure development is affected only by the triple valve 102 and inshot valve check 128. Note, however, that when brake pipe pressure is reduced to zero in the emergency application, pressure in Chamber C beneath the emergency equalizing valve return piston 133 is also reduced to zero, allowing the spring in Chamber D of this diaphragm piston 133 to move it down so that it no longer holds up the emergency equalizing valve stem 123. The emergency equalizing valve 123 will, however, be held up by the differential of auxiliary reservoir in Chamber E over brake cylinder pressure in Chamber F.

When brake cylinder pressure in Chamber F rises to within 2 psi of auxiliary reservoir pressure in Chamber E, the emergency equalizing valve stem 123 will begin to move downward under the influence of emergency spring 134 in Chamber J. Chamber J is connected to atmosphere through Choke Y and the small hole 135 through the center of the equalizing valve stem 123 to Chamber K beneath the spool 127, opening 137, and Chamber D above the emergency equalizing valve return piston 133. When the emergency equalizing valve stem 123 begins to move downward, supply valve air in Passage 117 flows upward through Passage 117a; and at the first motion of the emergency equalizing spool 123 downward, Passage 117a is connected to Chamber J past the upper land of the emergency equalizing valve spool 123, causing auxiliary reservoir pressure present in Passage 117 to vent into Chamber J where it acts on the top of the emergency equalizing valve stem 123 urging it rapidly downward. Since Choke Y is much smaller than the passage 117a admitting this air to Chamber J, pressure developing in Chamber J assures full motion of the emergency equalizing spool 123 downward until its motion is stopped by the rubber seat 136 at the bottom of Chamber K.

When the emergency equalizing valve rests on this seat 136, communication through Choke Y to atmosphere through openings 137 is blocked and brake cylinder pressure is maintained in Chamber F, where along with Spring 134, it continues to hold the emergency equalizing valve 123 downward against its lower seat 136.

Motion of the emergency equalizing valve stem 123 to its lower seat cuts off communication via Passage 115 of auxiliary reservoir to brake cylinder and the hollow 123a of the emergency equalizing valve stem 123. In its lower position, this hollow stem 123a of 123 is connected to the emergency reservoir providing passage of air to the brake cylinder from the emergency reservoir. Thus, using emergency reservoir air only to increase brake cylinder pressure and not wasting it by needlessly increasing auxiliary reservoir pressure as in earlier components with the emergency equalizing valve in its lower position, emergency reservoir air flows through the hollow 123a of stem 123 of the equalizing valve to Passage 117, thence, past the open supply valve to Passage 118, and through Choke Z of the inshot valve check 128 to the brake cylinder, adding a third or high pressure phase to brake cylinder pressure development.

Release after Emergency

With the brake applied in emergency, brake cylinder pressure, with an initial 70 psi brake pipe, would be 60 psi; auxiliary reservoir pressure would be 50 psi (lower than brake cylinder because of the emergency equalizing valve). Thus, when brakes are released, the brake pipe need only be restored to something above 50 psi to raise the pressure in Chamber A above the auxiliary reservoir pressure in Chamber B. This reduced brake pipe pressure requirement, along with the dumpback of air from the modulating valve 300 should overcome the need for the present accelerated emergency release feature.

As with service release, when the triple valve piston 124 moves down, it unseats its hollow spool 131 from the inner seat of the supply valve 127, permitting brake cylinder air to flow from brake cylinder to Passage 119 back through the inshot check valve 128, unseating this check 128, through Passages 118a and 118 and past the inner seat of the supply valve 127 to atmosphere through the hollow center 131 of the triple valve piston.

This action reduces brake cylinder pressure at a rate independent of inshot choke Z. As brake cylinder pressure reduces, so does the pressure in Chamber F above the emergency equalizing valve 132. At the same time this pressure is being reduced, pressure in Chamber C, beneath the emergency equalizing valve return piston 133, is acting to force the emergency equalizing valve 123 upward to its service position. When the brake cylinder pressure in chamber F above the emergency equalizing valve piston 132 drops to the point where the combined effort of auxiliary reservoir pressure in Chamber E and return piston pressure in Chamber C are sufficient to urge it upward, it will begin to move upward and will cut off communication through Passage 117a to Chamber J allowing Chamber J pressure to reduce to atmosphere through Choke Y, assuring that once the emergency equalizing valve 123 has started to move upward, this motion will be continued to its upper most stop and the release position. Finally, when brake cylinder pressure drops below 15 psi, this pressure acting in Chamber G will no longer be sufficient to keep the inshot valve piston 130 down and will allow this piston 130 to move up, aiding the back flow of air to keeping open the inshot valve check 128 and assuring complete release of brake cylinder air to the atmosphere.

Charging of the 650 cu. in. auxiliary reservoir will begin when sufficient differential of brake pipe pressure over auxiliary reservoir pressure exists to open the charging check 126 in the triple valve stem, and charging of the 150 cu. in. emergency reservoir will resume when auxiliary reservoir pressure has been restored above 60 psi so that pressure can flow from Passage 2 through Chamber C and the emergency reservoir charging check 122 to recharge this 150 cu. in. volume.

Empty Load Fixtures 200

In the event that an empty load brake system 200 is required, the empty load blanking plate 129 shown in FIG. 4 may be removed and the empty load device 200 shown diagrammatically in FIG. 5 is mounted to it with the load arm 202 connected to the car as shown in FIG. 2. This valve contains a simple ratioing valve 204, lock over piston 206, change over valve 208 and dummy volume 210, as shown in FIG. 5, and operates in the following manner:

Empty Car Brake Application

When a brake application is made, brake cylinder pressure enters from the triple valve in Passage 221 and flows to Chamber A on the left side of the ratio valve. Simultaneously, air flows through Passage 211a to the semi-circular area 208a on top of the change over valve key 208. In the event that the car is light, the load arm 202 will be positioned downward; and brake cylinder air will flow from Passage 211a past the key 208 to Passage 213, thence to Chamber C on the right hand side of the lock over piston 206. Chamber D on the left hand side of lock over piston 206 is vented to atmosphere by area 208b on the change over valve key 208. Moving this piston 206 to the left requires only 5 psi or less; and in its left most position, the piston is detented by an annular spring 207 engaging a detent groove 209a.

As air pressure continues to rise in the supply pressure in Chamber A on the left hand side of the ratio valve 204 exerts less force on the spool of this valve 204 than does the brake cylinder pressure in Chamber B on its right hand side, forcing the double piston spool to the left against the ratio valve seat at a ratio of 50, 60 or 70% of input pressure, as determined by the particular diaphragms used. As supply pressure from the triple valve continues to rise, Chamber A pressure will build up, forcing the spool to the right, allowing further passage of air through the hollow spool to Chamber B causing it, again to close, with Chamber B pressure always at the desired ratio to Chamber A pressure.

Air also flows from Chamber A through Passage 211b and the unseated dummy volume cut-off check valve 230 into Passage 212 and the dummy volume 210. Since the dummy volume 210 is only 69 cu. in., this volume will accept the additional air supplied by the triple valve and not needed by the brake cylinder at the lower pressure of the ratio valve 204, thus, bringing about an equal reduction in auxiliary reservoir pressure in response to brake pipe pressure reduction whether the car is empty or loaded. Thus, at final equalization in either service or emergency, the output pressure of the triple valve in Passage 211 will be exactly the same, whether the car is loaded or empty. Brake cylinder pressure, however, whether service or emergency, will be 50, 60 or 70% of that provided by the triple valve as determined by the ratio of Chamber A area to Chamber B area.

Note that during the above light, car operation, brake cylinder air from Chamber B also flows through 214a to the face of bypass check valve 232 but cannot open this valve because of the higher supply pressure behind it from 211c, which holds it to its seat. However, if the car becomes heavier after an initial light load application and before release, change over key valve 208 will rotate causing lock over piston 206 to move right opening bypass check valve 232 and allow dummy volume cut-off check 230 to close. This allows the brake cylinder pressure at 214 to equalize and reduce with the supply from the triple valve at 211 via the bypass paths. Dummy volume cut-off check 230, responsive to the reduction of pressure in the passage 211b, opens to equalize and reduce the pressure in dummy volume 210.

Empty Car Brake Release

When brake cylinder pressure is released, air flows from Chamber A out to the triple valve, through the triple valve, and to atmosphere causing the ratio valve 204 to close more tightly to its seat. However, air from brake cylinder in Passage 214 can flow through Chamber B, through Passage 214a, and will unseat the bypass check 232 because of its differential over the now reduced supply pressure in Passage 211c. Thus, during release, brake cylinder pressure flows from brake cylinder into Passage 214, through Chamber B, Passage 214a, past the bypass check valve 232, unseating it, into Passage 211c, Passage 211b, Chamber A, and out Passage 211 to the triple valve and exhaust. Since dummy volume cut-off check 230 is held open by lock over piston 206, the dummy reservoir 210 is also emptied via Passage 211b etc.

Loaded Card Brake Application

If the car weighs heavy, the load arm 202 will be moved upward and Passage 211a will be connected through the changeover valve key area 208a to Passage 215. Supply air will, thus, enter Chamber D on the left side of the lock over piston 206, forcing it to the right, in which position it will be detected by detent spring 207 and groove 209b, forcing the bypass check 232 off of its seat and allowing the dummy volume cut-off check 230 to move to its seat.

As air pressure builds up in Passage 211 and Chamber A where, again, it flows through the hollow piston rod of the ratio valve 204 to Chamber B and the brake cylinder and, again, forces the ratio valve to the left. However, with the lock over piston 206 in its right hand position, air can flow from Chamber A through Passages 211b and 211c and past the opened bypass check 232 into Passage 214, Chamber B, and out to the brake cylinder.

Since the dummy volume 212 is not desired cut in, as all air supplied by the triple valve in the loaded position must be passed to the brake cylinder, the dummy volume cut-off check 230, which is permitted to move to its seat by the lock over piston 206, will do so and prevent unnecessary loss of air to the dummy volume 210.

Loaded Car Brake Release

When brakes are released after an application with the empty load fixtures in the loaded position, air flow out of the valve is exactly the same as in the empty position with the exception that brake cylinder pressure does not have to move the bypass check 232 off of its seat as it is held open by the lock over piston 206 in any case.

E-1 Brake Pipe Modulation Valve 302

The purpose of the E-1 brake pipe modulating valve 302 shown in FIG. 3 and diagrammatically in FIG. 6, is to provide quick service propagation of an initial service application and to provide a continuous quick service function. A third purpose is to control the storage and release back to brake pipe of air in a release volume so as to provide accelerated release of brakes after both service and emergency brake applications.

The only connection to the E-1 brake pipe modulating valve 302 is to the brake pipe and the augmentation of brake pipe pressure change it provides will be comparable to those in the AB, ABD and ABDW type control valves.

Initial Charging

When charging this valve 302, air flows initially from brake pipe by passage 311 to the underside of accelerated release valve piston 320, Chamber A, thence through Passage 316 to Chamber C on the underside of accelerated application pilot valve piston 322. Air from Chamber C flows through Quick Action Chamber Charging Choke Y and Passage 317 to the quick action chamber 308, and Passage 317a to the back of the accelerated application pilot valve check valve 324. Air flowing through Choke Y is at quick action chamber pressure and is communicated via Passage 317b to Chamber D, above the accelerated application pilot valve piston 322 and Chamber B, above the accelerated release valve piston 320.

Note that brake pipe pressure in Passage 316 also flows through Passage 316a to Choke Z and to the face of release reservoir control check 326 through Passage 316b. Brake pipe air flows through Choke Z into Passage 318 and the underside of the accelerated release check 328, thence past this check 328 into Passage 319 whence it charges the release reservoir and through Passage 319a to Chamber F above the quick service limiting valve piston 330.

Service Application-Quick Service

With the equipment fully charged, pipe pressure may be reduced to initate a brake application. When such a reduction is begun simultaneous reduction of pressure in Chambers A, C and E occurs. No motion of the quick service limiting valve 332 will occur because it is held up by a 3 psi differential spring 334 in Chamber G. The accelerated release valve piston 320 will initially be resting on the stabilizing spring cage 336, having permitted the accelerated release check 328 to close at the termination of release reservoir 306 charging. The accelerated release valve piston 320 will not move down until the brake pipe pressure drops about ½ psi and will not move down until the stabilizing spring has been overcome. When this occurs, the accelerated release valve diaphragm piston 320 will move down opening the quick service check valve 338. When the quick service check valve 338 is moved off its seat, brake pipe air will flow to the quick service volume 340; and because of the proximity of the quick service check 338 to Chamber A, this flow will cause a further downward motion of the accelerated release valve piston 320, thus, assuring that the quick service check 338 will open wide, permitting brake pipe pressure to flow from brake pipe through Passage 311, Chamber A, Passage 312, past the open quick service check 338 to the quick service limiting valve spool 332, hence, into the quick service volume 340.

Initial flow of air will be rapid enough to propagate this quick service action to the next car and will terminate when a 3 psi differential of release reservoir pressure over brake pipe pressure is established, which differential will move the quick service limiting valve spool 332 down cutting off further communication with brake pipe through the quick service check 338.

At this same time, accelerated application pilot valve piston 322 also moves down forcing its check 324 from its seat and permitting quick action chamber 308 air to flow from Passage 317a past the open check valve 324 to atmosphere through Choke U, while subjecting the inner area of the accelerated application valve diaphragm 342 to the pressure backed up by Choke U.

If this backed up pressure is sufficient, it will cause the accelerated application diaphragm 342 to move downward from its seat exposing the larger outer area and permitting the upper accelerated application check valve to seat 344, cutting off communication between brake pipe in Passage 312 and the already charged bulb volume 346. As long as the accelerated application pilot valve 322 is down, permitting quick action chamber 308 air to flow to atmosphere, the accelerated application valve piston 342 will be held down by air acting over its full upper diaphragm face, and will drain the bulb volume 346 through Passage 314 and its lower check valve 348. When quick action chamber 308 pressure reduction exceeds that of the brake pipe, the accelerated application pilot valve piston 322 will rise, allowing its check 324 to close and cut off the supply of quick action chamber 308 air to the accelerated application valve piston 342 which will allow its upper chambers to drain through Chokes U and T. This action will allow the accelerated application valve piston 342 to move upward, returning its lower check 348 to its seat to prevent further draining of the bulb volume 346 and reopening its upper check 344, thus, reconnecting the drained bulb volume 346 to brake pipe causing a controlled volume of air to be withdrawn from it, thus, causing a further reduction of brake pipe pressure by allowing Passage 312 to communicate past the upper check 344 to Passage 313 and through Choke V with the now drained bulb volume 346. After quick service activity has terminated, any time brake pipe pressure is reduced, the accelerated application pilot valve piston 324 will, again, move down triggering this sequence of events much the same way the accelerated application valve operates on the present ABDW emergency AAV portion.

Accelerated Brake Release

Whenever brake pipe pressure rises above quick action chamber pressure in Chamber B by more than a predetermined amount, accelerated release valve piston 320 will be moved upward and unseat the accelerated release check 328. This action will dump accelerated release volume 306 back to brake pipe, aiding in the restoration of brake pipe pressure by way of Passage 319, past the open accelerated release check 328, Passage 318 and 318a, through the release control check 326 bypassing Choke Z, into Passage 316a and 316b, Chamber A, and out Passage 311 to the brake pipe. At the same time, the motion of the accelerated release valve piston 320 upward allows the quick service check 338 to seat, preventing the exhaustion of brake pipe air when the quick service limiting valve 332 returns to its upper position. As brake pipe pressure recharges and accelerated release reservoir air pressure decreases, the differential of Chamber A over Chamber B in the accelerated release valve will be decreased; and when brake pipe pressure is less than 5 psi, higher than accelerated release check 328 pressure, the accelerated release check 328 spring will return this check valve 328 to its seat and the E-1 brake pipe modulating valve 302 will be returned to its fully charged position. Above this pressure, brake pipe pressure can only be supplied from the locomotive; and when a further 3 psi has been built up in the brake pipe, its pressure will be higher than accelerated release reservoir pressure and accelerated release reservoir 306 recharge will begin through Choke Z and the accelerated release reservoir charging check 328.

From the preceding description of the preferred embodiments, it is evident that the objects of the invention are attained in that reduced size reservoirs are mounted directly to the triple valve which are mounted on each truck. The accelerated application and release functions are separate from the triple valve and are distributed throughout the train. Although the invention has been described and illustrated in detail, it is to be clearly understood that the same is by way of illustration and example only and is not to be taken by way of limitation. The spirit and scope of the invention are to be limited only by the terms of the appended claims.

What is claimed is:

1. A valve for interconnecting a brake pipe, an auxiliary reservoir, an emergency reservoir and a brake cylinder comprising:
   brake pipe, auxiliary reservoir, emergency reservoir, brake cylinder and atmosphere ports;
   first sensing means for sensing the pressure at said brake pipe port;
   second sensing means for sensing the differential pressure between said brake pipe port and auxiliary reservoir port;
   third sensing means for sensing the differential pressure between said auxiliary reservoir port and brake cylinder port;
   first valve means connected to said auxiliary reservoir port, emergency reservoir port and said first and third sensing means, including an I/O port, and having a first position for interconnecting said auxiliary reservoir port and said I/O port and isolating said emergency reservoir port from said I/O port for a first brake pipe port pressure sensed by said first sensing means and a second position for interconnecting said emergency reservoir port and said I/O port and isolating said auxiliary reservoir port from said I/O port for a second brake pipe port pressure sensed by said first sensing means and a first differential pressure sensed by said third sensing means; and
   second valve means connected to said first valve means I/O port, said brake cylinder port, said atmosphere port and said second sensing means for isolating said I/O port, said brake cylinder port and said atmosphere port from each other for a first differential pressure sensed by said second sensing means, interconnecting said I/O port and said brake cylinder port and isolating said atmosphere port for a second differential pressure sensed by said second sensing means, and interconnecting said brake cylinder port and said atmosphere port and isolating I/O port for a third differential pressure sensed by said second sensing means.

2. A valve according to claim 1, including
   first check valve means between said brake pipe port and said emergency reservoir port for interconnecting said emergency reservoir port and said brake pipe port for a given differential pressure thereacross; and
   second check valve means between said brake pipe port and said auxiliary reservoir port for interconnecting said auxiliary reservoir port and said brake pipe port for a given differential pressure thereacross.

3. A valve according to claim 2, wherein said second check valve means is connected to and actuated by said second sensing means.

4. A valve according to claim 1, including means for applying I/O port pressure to said first valve means to accelerate said first valve means transition from said first to said second position for said second brake pipe port pressure and at a second differential pressure less than said first differential pressure sensed by said third sensing means.

5. A valve according to claim 1, including a variable flow means connected between said second valve means and said brake cylinder port for providing a first flow rate for a first brake cylinder port pressure and a second flow rate for a second brake cylinder port pressure.

6. A valve according to claim 5, wherein said first flow rate is greater than said second flow rate and said first brake cylinder port pressure is less than said second brake cylinder port pressure.

7. A valve according to claim 1, including fourth sensing means for sensing load of a vehicle to which said valve is to be mounted, and load valve means connected between said brake cylinder port and said second valve means and connected to said fourth sensing means for providing a first proportion of fluid pressure from said second valve means to said brake cylinder port for a first load sensed by said fourth sensing means and for providing a second proportion of fluid pressure from said second valve means to said brake cylinder port for a second load sensed by said fourth sensing means.

8. A valve according to claim 7, wherein said first proportion is greater than said second proportion; and including a dummy reservoir and means for connecting fluid from said second valve means to said dummy reservoir for a second load sensed by said fourth sensing means.

9. A valve for interconnecting a brake pipe, an auxiliary reservoir, an emergency reservoir and a brake cylinder comprising:
brake pipe, auxiliary reservoir, emergency reservoir, brake cylinder and atmosphere ports;
sensing means connected to said brake pipe port for sensing a service signal, a release signal and an emergency signal pressures on said brake pipe port; and
valve means connected to said brake cylinder port, auxiliary reservoir port, emergency reservoir port and atmosphere port and said sensing means for
(a) interconnecting said brake cylinder port and auxiliary reservoir port for a service signal sensed by said sensing means;
(b) interconnecting said brake cylinder port and atmosphere port for a release signal sensed by said sensing means; and
(c) sequentially interconnecting said brake cylinder port and said auxiliary reservoir port, isolating said brake cylinder port from said auxiliary reservoir port and interconnecting said brake cylinder port and said emergency reservoir port for an emergency signal sensed by said sensing means.

10. A valve according to claim 9, wherein said valve means includes means connected to said sensing means and auxiliary reservoir port for causing said valve means to disconnect said brake cylinder port and auxiliary reservoir port when said auxiliary reservoir port pressure is approximately equal to said service signal pressure.

11. A valve according to claim 9, wherein said valve means includes emergency means connected to said auxiliary reservoir port and brake cylinder port for causing said valve to isolate said brake cylinder port from said auxiliary reservoir port and interconnecting said brake cylinder port and emergency reservoir port when said brake cylinder port pressure is approximately equal to sense auxiliary reservoir port pressure.

12. A load responsive valve comprising:
sensing means for sensing the load of a vehicle to which said valve is to be mounted;
an inlet port;
an outlet port;
first means connected between said inlet and outlet ports for providing a predetermined portion of said inlet port pressure to said outlet port;
second means connected to said sensing means and in parallel with said first means for bypassing said first means for a loaded condition sensed by said sensing means;
said load responsive valve comprising a dummy reservoir and third means connected to said sensing means, said inlet port and said dummy reservoir for interconnecting said inlet port and said dummy reservoir for an unload condition sensed by said sensing means; and
said second and third means including second and third valves respectively and double acting actuator means connected to said second and third valves and said second means for simultaneously opening said one valve and closing the other valve and vice versa.

13. A load responsive valve according to claim 12, wherein said second means includes fourth means for causing said second means to bypass said first means when the pressure at said outlet exceeds the pressure at said inlet.

14. A load responsive valve according to claim 12, wherein said second valve is a bypass check valve when an unloaded condition is sensed by said sensing means and opens when the pressure at said outlet exceeds the pressure at said inlet.

15. A load responsive valve according to claim 12, wherein said third valve is a dummy reservoir check valve when a loaded condition is sensed by said sensing means and opens when the pressure in said dummy reservoir exceeds the pressure at said inlet.

16. A modulating valve to be connected to a brake pipe comprising:
brake pipe and atmosphere ports;
a quick service volume;
a bulb volume;
a release reservoir;
sensing means connected to said brake pipe port for sensing a service signal, release signal and an emergency signal pressures on said brake pipe port; and
valve means connected to said brake pipe port, atmosphere port, said quick service volume, bulb volume, said release reservoir and said sensing means for
(a) filling said quick service volume with fluid from said brake pipe port for a service signal sensed by said sensing means;
(b) sequentially venting said bulb volume to said atmosphere port and refilling said bulb volume from said brake pipe port as a function of the magnitude of the service signal sensed by said sensing means;
(c) charging said brake pipe port with fluid from said release reservoir for a release signal sensed by said sensing means.

17. A modulating valve according to claim 16, including means connected to said valve means, service reservoir, release reservoir and brake pipe port for discontinuing filling of said release reservoir at a preselected differential pressure between said release reservoir and said brake pipe port.

18. A modulating valve according to claim 16, including a quick action chamber means connected to said valve means for providing a fluid pressure to said valve means to accelerate initiation of filling said quick service volume and venting said bulb volume.

19. A modulating valve according to claim 18, including means connected to said sensing means, said quick action chamber means and said atmosphere port for venting said quick action chamber to decrease its effect on said valve means after said accelerated initiation.

20. A brake system for a train having a plurality of cars, each car including at least one truck, said brake system comprising:
   a brake pipe;
   a plurality of brake cylinders, one on each truck;
   a plurality of pairs of auxiliary and emergency reservoirs, one pair for each truck;
   a plurality of triple valve means, one for each truck, connected to said brake pipe, brake cylinder and auxiliary and emergency reservoirs for receiving service application, emergency application and release signals on said brake pipe and providing brake applications to said brake cylinder from said reservoirs and releasing said brake cylinder in response to a respective received signal; and
   a plurality of modulating means, less than the number of trucks, connected along said brake pipe for accelerating said signals down said brake pipe.

21. A brake system according to claim 20, wherein said reservoirs are mounted directly to their respective triple valve means.

22. A brake system according to claim 21, wherein said triple valve means is mounted to their respective trucks.

23. A brake system according to claim 20, wherein said modulating means includes means for venting said brake pipe in response to an emergency application signal, means for selectively venting said brake pipe in response to a service application signal, a release reservoir and means for applying pressure from said release reservoir to said brake pipe in response to a release signal.

24. A brake system according to claim 23, wherein said modulating means includes a quick service volume and means for filling said quick service volume in response to a service application signal.

25. A brake system according to claim 24, wherein said modulating means includes a quick action means for accelerating initiation of said filling means and said venting means.

26. A brake control system for a train of cars comprising:
   (a) brake pipe means secured to car bodies throughout a train of cars for selectively designating brake application and release signals by the selective charging and discharging of the brake pipe with fluid,
   (b) braking equipment for at least one car of a train of cars selectively responsive to changes of pressure in the brake pipe comprising:
      (1) truck brake control means for at least one truck of each car, having pneumatic control connections to the brake pipe only on the car body, for governing braking of the associated truck, and
   (c) modulation control means, independent of any truck brake control means, having pneumatic control connections to the brake pipe only on the car body, for sensing changes in pressure in the brake pipe and for locally assisting in propogation of such pressure changes through the brake pipe.

27. A brake control system according to claim 26 wherein a truck brake control means is provided for each truck on a car having friction brakes.

28. A brake control system according to claim 26 wherein modulation control means is connected to the brake pipe at spaced intervals along the brake pipe throughout the train, independent of the spacing of the truck brake control means along the brake pipe.

29. A brake control system according to claim 26, 27, or 28 wherein the truck control means does not include means for duplication of the functions of the modulation control means.

30. A brake control system for a train of cars according to claim 26 wherein the truck brake control means comprises;
   (a) fluid brake motor means for operating brakes on the associated car truck,
   (b) auxiliary and emergency fluid reservoir means at times subject to charge from the brake pipe and at other times delivering fluid pressure to the brake motor means,
   (c) triple valve means for selectively connecting the reservoir means to the brake motor means, and
   (d) sensing means for actuating the triple valve means in accordance with changes of pressure in the brake pipe to actuate the triple valve means selectively to positions for operating the brake motor means to application, lap and release positions respectively.

31. A brake control system according to claim 30 wherein the truck brake control means comprises;
   (a) emergency valve means operable when activated to disconnect the fluid motor means from the auxiliary reservoir means and connect the fluid motor means to the emergency reservoir means to further increase fluid pressure in the fluid motor means to emergency application pressure, and
   (b) sensing means connected to the brake pipe for sensing an emergency application fluid pressure signal therein and for activating the emergency valve means to connect the emergency reservoir means to the fluid motor means when pressure in the fluid motor means is substantially equal to pressure in the auxiliary reservoir;
   (c) the emergency valve means being operable when activated to isolate the auxiliary reservoir from higher fluid pressure in the emergency reservoir.

32. A brake control system according to claim 31 wherein the truck brake control means comprises;
   (a) inshot valve means for controlling an initial stage rate of charge of the fluid brake motor means during a brake application.

33. A brake control system according to claim 32 wherein the brake motor means comprises;
   (a) brake cylinder means subject to actuation by fluid pressure governed by the triple valve means, and
   (b) slack adjuster means connected to the brake cylinder means for adjusting required travel of a brake rod of the brake cylinder means to compensate for wear of brake shoes.

34. A brake control system according to claim 26 wherein the modulation control means comprises:
   (a) accelerated release valve means for sensing a service application signal in the brake pipe and opening a quick service check valve to locally release fluid from the brake pipe to a quick service volume and from the volume through a choke to atmosphere and through another passage to a bulb volume through a normally open check valve governed by acceleration application valve means, and
(b) quick service limiting valve means for sensing a limited initial reduction in the brake pipe pressure and terminating fluid flow from the brake pipe to the quick service volume.

35. A brake control system according to claim 34 wherein the modulation control means comprises:
   (b) accelerated application pilot valve means for sensing a service application signal in the brake pipe and thereby permitting fluid from a quick action chamber to flow past a check valve opened by the pilot valve to atmosphere through an atmospheric choke, and
   (b) accelerated application valve means having means for sensing fluid pressure in a passage between the quick action chamber and the atmospheric choke for closing the normally open check valve means and opening another check valve means to permit the bulb volume fluid to be exhausted, thus completing a cycle of continuous quick service cycle control means.

36. A brake control system according to claim 35 wherein the modulation control means comprises:
   (a) release volume means normally charged to brake pipe pressure for locally charging the brake pipe, when rendered effective to provide accelerated release of the brake motor means,
   (b) means for sensing when the brake pipe pressure rises above quick action chamber pressure by a predetermined amount for actuating the accelerated release valve to unseat an accelerated release check valve, and
   (c) charging means for the brake pipe effective locally upon unseating of the accelerated release check valve to charge the brake pipe from the release volume.

* * * * *